United States Patent
Touret et al.

(10) Patent No.: US 9,325,370 B2
(45) Date of Patent: Apr. 26, 2016

(54) SYNCHRONIZATION METHOD AND SYSTEM

(71) Applicant: THALES, Neuilly-sur-Seine (FR)

(72) Inventors: Marc Touret, Gennevilliers (FR);
Thierry Menigand, Gennevilliers (FR);
Marc Coutolleau, Gennevilliers (FR)

(73) Assignee: Thales, Courbevoie, Paris ( * ) Notice: Subject to any disclaimer, the term of this patent is extended or adjusted under 35 U.S.C. 154(b) by 261 days.

(21) Appl. No.: 13/956,239

(22) Filed: Jul. 31, 2013

(65) Prior Publication Data

US 2014/0036962 A1 Feb. 6, 2014

(30) Foreign Application Priority Data

Aug. 3, 2012 (FR) ...................................... 12 02182

(51) Int. Cl.

| H04B 1/00 | (2006.01) |
|---|---|
| H04B 1/7156 | (2011.01) |
| H04B 7/185 | (2006.01) |
| H04W 56/00 | (2009.01) |

(52) U.S. Cl.
CPC .......... *H04B 1/7156* (2013.01); *H04B 7/18513* (2013.01); *H04W 56/0035* (2013.01)

(58) Field of Classification Search
CPC ................. H04B 1/7156; H04B 1/713; H04B 2001/71563; H04B 1/709; H04B 2001/71566
USPC .................................. 375/130–138, 239, 256
See application file for complete search history.

(56) References Cited

U.S. PATENT DOCUMENTS

| 6,430,211 | B1* | 8/2002 | Aiello ........................... 375/135 |
| 6,956,814 | B1* | 10/2005 | Campanella ....... H04B 7/18534 370/210 |
| 7,889,753 | B2* | 2/2011 | Ekbal ................. H04B 1/71632 370/431 |
| 2002/0191690 | A1* | 12/2002 | Pendergrass ........ H04L 25/4902 375/239 |
| 2004/0071200 | A1* | 4/2004 | Betz et al. ...................... 375/152 |
| 2005/0089083 | A1* | 4/2005 | Fisher .................. H04B 1/7075 375/130 |
| 2009/0023385 | A1 | 1/2009 | Blineau et al. |
| 2009/0296684 | A1 | 12/2009 | Ye et al. |
| 2009/0310654 | A1* | 12/2009 | Ahmed et al. ................. 375/150 |
| 2011/0021155 | A1 | 1/2011 | Ozaki et al. |

FOREIGN PATENT DOCUMENTS

| WO | 96/24992 A1 | 8/1996 |
| WO | 98/27684 A1 | 6/1998 |
| WO | 99/43085 A1 | 8/1999 |
| WO | 01/49000 A1 | 7/2001 |
| WO | 2007082036 A1 | 7/2007 |
| WO | 2010060732 A1 | 6/2010 |

* cited by examiner

*Primary Examiner* — James M Perez
(74) *Attorney, Agent, or Firm* — Baker & Hostetler LLP

(57) ABSTRACT

A method of emission of a frequency synchronization signal comprises a first step of determining at least two first emission frequencies respectively associated with at least two first intervals separated temporally by a first duration. The first temporal intervals are of identical duration. The first durations are identical for identical first frequencies and the first durations are different for different first frequencies. The method also comprises a second step of emitting at least one synchronization signal in the first temporal intervals and by using the first frequency, the signal emitted in the first intervals being identical.

4 Claims, 2 Drawing Sheets

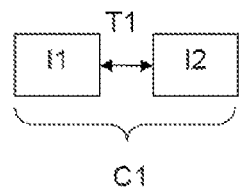
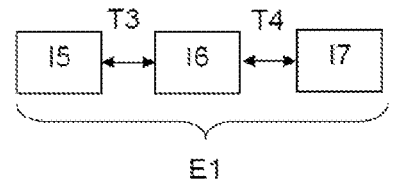
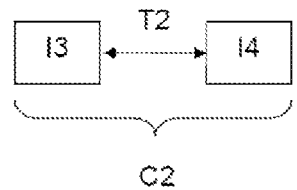
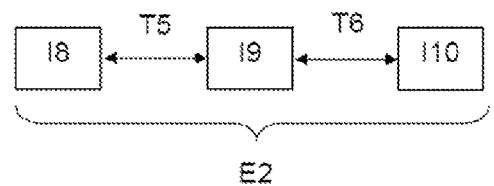
FIG.1  FIG.2
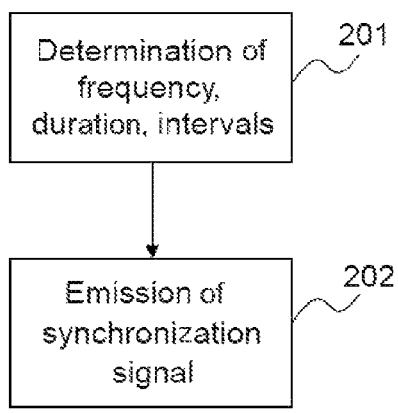
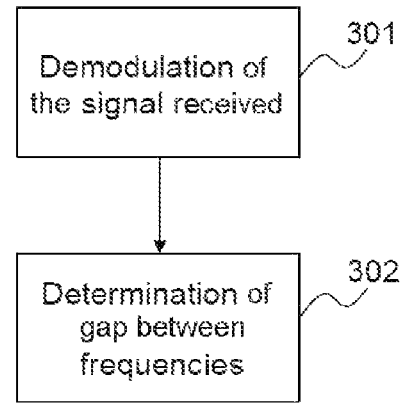
FIG.3  FIG.4

SYNCHRONIZATION METHOD AND SYSTEM

CROSS-REFERENCE TO RELATED APPLICATION

This application claims priority to foreign French patent application No. FR 1202182, filed on Aug. 3, 2012, the disclosure of which is incorporated by reference in its entirety.

FIELD OF THE INVENTION

The present invention relates to a method allowing frequency synchronization of a satellite terminal with a satellite or a terrestrial station. All of these elements belonging to one and the same system for transmitting satellite data.

BACKGROUND

Methods of satellite pointing using a synchronization signal based on a modulated pseudo random sequence are known in the prior art. This modulation can for example be carried out by using a two-state phase modulation (also known by the name of BPSK for Binary Phase Shift Keying). This synchronization signal, emitted in one or more temporal intervals, is also known in the prior art by the name of beacon.

However, as low-cost satellite terminals generally comprise a low-performance local oscillator, the terminals generally exhibit a frequency shift with the satellite or the terrestrial station of several kHz, to which is added a possible shift caused by the Doppler effect.

These shifts in frequency slow down the synchronization between the satellite terminal and the satellite or the terrestrial station. Indeed, the terminal is required to make several assumptions about this possible shift in frequency. The time required for the synchronization will therefore depend on the computation power available in the satellite terminal and on the number of assumptions to be made. For example if the receiver must search for the synchronization signal in a span of 50 kHz in increments of 1 kHz, then the satellite terminal is required to make 101 assumptions about the shift in frequency. If each assumption requires a computation of 10 seconds, the total synchronization time is around 17 minutes. Moreover the computation power, required for a first synchronization, is in general greater than the computation power required for tracking this synchronization. The computation power used for the process of initial synchronization is therefore under-used during the major part of the time.

SUMMARY OF THE INVENTION

The present invention is therefore aimed at remedying these problems by proposing a method and a system for frequency synchronization limiting the computation power and the time required for carrying out this frequency synchronization.

Thus there is proposed, according to one aspect of the invention, a method of emission of a frequency synchronization signal comprising a first step of determining at least two first emission frequencies respectively associated with at least one first set of at least two first temporal intervals separated temporally by a first duration. The said first temporal intervals are of identical duration. The said first durations are identical for identical first frequencies and the said first durations are different for different first frequencies. The method also comprises a second step of emitting a synchronization signal in the first temporal intervals and by using respectively the first frequency associated with the temporal interval. The said synchronization signal emitted in the various first intervals is identical.

The proposed method of emission therefore allows the emission of a synchronization signal having a greater spectral width relative to a normal method. FIG. 1 illustrates the emission of a synchronization signal in four temporal intervals. These temporal intervals are grouped together into two first sets C1 and C2. The first set C1 comprises the temporal intervals I1 and I2 and the first set C2 comprises the temporal intervals I3 and I4. The signals emitted in the temporal intervals of the first set C1 use a band of frequency F1 and the signals emitted in the temporal intervals of the first set C2 use a band of frequency F2. Moreover the two temporal intervals of the first set C1 are separated by the duration T1 and the two temporal intervals of the first set C2 are separated by the duration T2, different from the duration T1. Therefore the two frequencies F1 and F2 used to emit a signal in the temporal intervals of the first sets C1 and C2 are determinable by comparing the duration separating the two temporal intervals (I1 and I2 or I3 and I4) of one and the same pair of temporal intervals.

According to a technical characteristic, the first step of the method of emission is adapted for determining at least two first frequencies whose spectral separation is greater than the spread spectrum bandwidth of the synchronization signal.

This technical characteristic allows the emission of a synchronization signal having a double spectral width relative to a normal method.

Advantageously the first temporal intervals belong to a set of contiguous temporal intervals.

Advantageously the least common multiple of the first durations T1 is greater than a threshold.

The least common multiple, known also by the name LCM, of two non-zero integers a and b is the smallest strictly positive integer which is at one and the same time a multiple a and of b. In an optimal manner the threshold is equal to the number of first frequencies, multiplied by the duration of the first temporal intervals.

According to another technical characteristic the said first frequencies are respectively associated with at least three first temporal intervals separated temporally by two first durations.

If these temporal intervals are denoted A, B and C and are ranked in chronological order, these two durations can be the duration between A and B, and the duration between B to C. It is also possible to define instead of the duration between A and B or the duration between B and C, the duration between A and C.

This technical characteristic makes it possible to improve the synchronization signal reception performance by avoiding, in particular, ambiguities and by limiting the errors of temporal estimation.

FIG. 2 illustrates an embodiment in which the emission of a synchronization signal is carried out in six temporal intervals (I5 to I10). These temporal intervals are grouped together into two first sets (E1 and E2). The first set E1 comprises three first temporal intervals (I5 to I7). The first intervals I5 and I6 are separated by a duration T3 and the first intervals I6 and I7 are separated by a duration T4. The first set E2 comprises three first temporal intervals (I8 to I10). The first intervals I8 and I9 are separated by a duration T5 and the first intervals I9 and I10 are separated by a duration T6. The first intervals of the first set E1 are emitted by using the first frequency F1 and the first intervals of the first set E2 are emitted by using the first frequency F2.

Thus there is also proposed, according to one aspect of the invention, a method of reception comprising a first step of demodulating the signal received, the demodulation is carried out by using a second frequency. The method of reception also comprises a second step of determining the gap between at least one of the first frequencies and the second frequency by determining at least two second temporal intervals in which the energy of the demodulated signal is a maximum.

The proposed method of reception therefore makes it possible to determine the first frequency which has been used for the emission of the synchronization signal in the pair of temporal intervals. This determination is carried out on the basis of the duration separating the two temporal intervals of the pair. The method of reception also uses the fact that the synchronization signals are identical and therefore it requires only a single correlation with a synchronization signal. There is no need to effect several correlations associated with various synchronization signals.

Advantageously the second step of the method of reception is furthermore adapted for the determination of a second duration separating the two second intervals and/or the comparison between the second duration and the said first durations.

Advantageously the second step of the method of reception is furthermore adapted for the determination of at least three second temporal intervals in which the energy of the said demodulated signal is a maximum and/or for the determination of two second durations separating the two second intervals and/or the comparison between the said second durations and the said first durations.

There is moreover proposed a frequency synchronization system comprising at least one satellite and/or at least one terrestrial station able to emit a frequency synchronization signal by using the preceding method of emission. The system also comprises at least one satellite terminal able to receive a frequency synchronization signal by using the method of reception.

BRIEF DESCRIPTION OF THE DRAWINGS

The invention will be better understood and other advantages will become apparent on reading the detailed description given by way of nonlimiting example and with the aid of the figures among which:

FIG. 1 illustrates the emission of a synchronization signal in four temporal intervals FIG. 2 illustrates the emission of a synchronization signal in six temporal intervals FIG. 3 presents the method of emission according to one aspect of the invention FIG. 4 presents the method of reception according to one aspect of the invention

DETAILED DESCRIPTION

Figure 5:
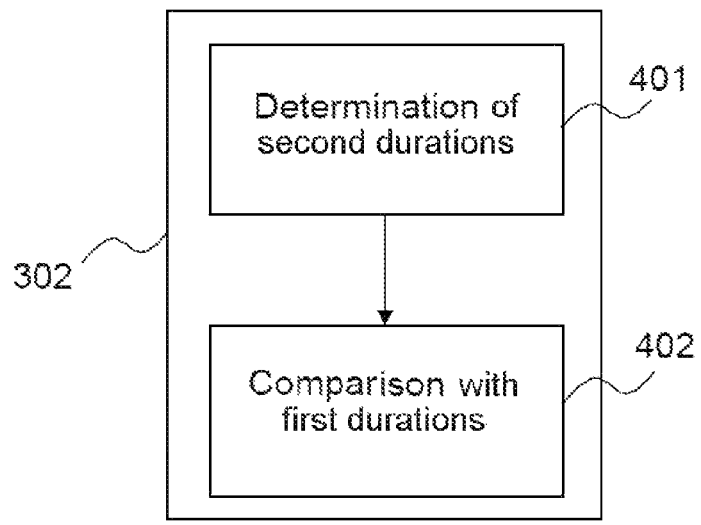
FIG. 5 presents the second step of the method of reception according to one aspect of the invention

The emission method described in FIG. 3 comprises a first step 201 of determining at least two emission frequencies. Each of these frequencies is associated with a first duration which separates two temporal intervals using this frequency. This first step also comprises the selection of at least one pair of first temporal intervals separated by the first duration. The emission method also comprises a second step 202 of emitting a synchronization signal in each of the two first temporal intervals of the pair and by using the first frequency associated with each pair. This signal is generally a pseudo random sequence, modulated by using a two-state modulation, known by the name of BPSK.

In order for the reception method to operate it is required that the first durations associated with two pairs be different. In an optimal manner it is required that this difference be greater than ten times the symbol frequency of the baseband synchronization signal.

The emission method therefore consists in emitting a synchronization signal (also known by the name of beacon in the prior art) in a pair of temporal intervals. The signals emitted in pairs of temporal intervals which differ are emitted with a different frequency. The emission method therefore makes it possible to emit on a more significant frequency band than when emitting synchronization signals using a single frequency. Moreover on account of the relation between the duration separating two temporal intervals used to emit signals and the frequency used for this emission, the receiver can determine the first frequency used for the emission of the signals of a pair of temporal intervals on the basis of the duration separating these two temporal intervals.

FIG. 1 illustrates the emission of a synchronization signal in four temporal intervals. These temporal intervals are grouped together into two first sets C1 and C2. The first set C1 comprises the temporal intervals I1 and I2 and the first set C2 comprises the temporal intervals I3 and I4. The signals emitted in the temporal intervals of the first set C1 use a band of frequency F1 and the signals emitted in the temporal intervals of the first set C2 use a band of frequency F2. Moreover the two temporal intervals of the first set C1 are separated by the duration T1 and the two temporal intervals of the first set C2 are separated by the duration T2. Therefore the two frequencies F1 and F2 used to emit a signal in the temporal intervals of the first sets C1 and C2 are determinable by comparing the duration separating the two temporal intervals (I1 and I2 or I3 and I4) of one and the same pair of temporal intervals.

In one embodiment it is possible to determine first frequencies which are separated spectrally by a width greater than the width of the spread band of the synchronization signal.

In another embodiment it is possible for the first temporal intervals to belong to a set of contiguous intervals.

In one embodiment the first durations are chosen in such a way that the least common multiple of these first durations is greater than a threshold equal to the number of first frequencies, multiplied by the duration of the first temporal intervals.

FIG. 2 illustrates an embodiment in which the emission of a synchronization signal is carried out in six temporal intervals (I5 to I10). These temporal intervals are grouped together into two first sets (E1 and E2). The first set E1 comprises three first temporal intervals (I5 to I7). The first intervals I5 and I6 are separated by a duration T3 and the first intervals I6 and I7 are separated by a duration T4. The first set E2 comprises three first temporal intervals (I8 to I10). The first intervals I8 and I9 are separated by a duration T5 and the first intervals I10 and I11 are separated by a duration T6. The first intervals of the first set E1 are emitted by using the first frequency F1 and the first intervals of the first set E2 are emitted by using the first frequency F2.

The reception method described in FIG. 4 comprises a first step 301 of demodulating the signal received. This demodulation is carried out by considering that the frequency spread band of the signal received is centred on a second frequency. Various demodulators are known in the prior art. This reception method also comprises a second step 302 which makes it possible to determine the gap between at least one first frequency used for the emission of the synchronization signal and the second frequency.

This second step is separated into two sub-steps such as presented in FIG. 5. A first sub-step 401 which allows the determination of two second temporal intervals in which the energy of the demodulated signal is a maximum. This step also comprises the computation of a second duration separating these two second temporal intervals. A second sub-step 402 then compares this second duration with the first durations associated with the various first frequencies. This step makes it possible to determine the first frequency which has been used to emit the synchronization signals, in these two second temporal intervals. The receiver can then synchronize its local oscillators so that the second demodulation frequency depends on one of the first frequencies of emission of the synchronization signals.

Thus stated otherwise the method of the invention allows, on emission, the matching of each emission frequency with a duration separating the intervals over which the synchronization signal using this frequency is emitted. A different duration is defined for each of the various frequencies. This matching can for example be carried out via a lookup table.

Thereafter during reception, the receiver detects the temporal intervals for which the power of the signal is a maximum and determines the duration separating these temporal intervals in which the power of the signal is a maximum. Thereafter the receiver can perform the matching inverse to that carried out on emission and thus retrieve the synchronization signal emission frequency. This inverse matching can for example be carried out via a lookup table.

Figure 6:
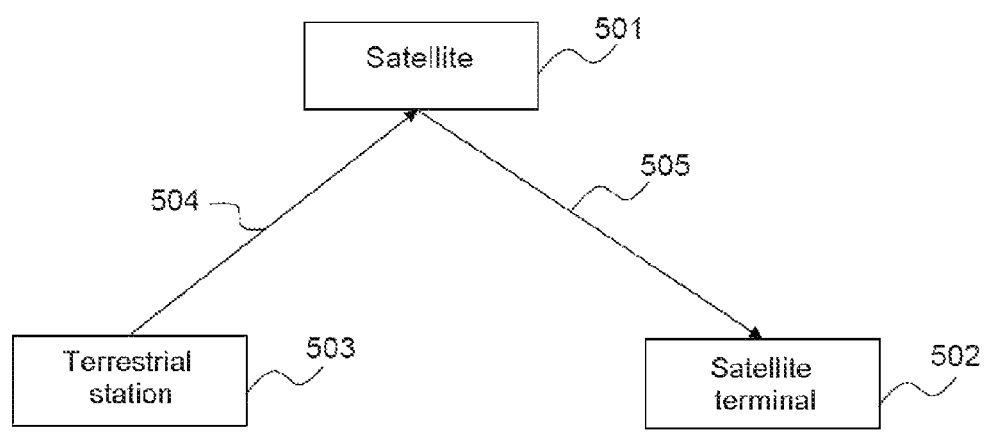
FIG. 6 presents the system according to one aspect of the invention

FIG. 6 presents a system using the method of emission and the method of reception. This system comprises a satellite 501, a terrestrial station 502 and a satellite terminal 503.

In one embodiment of this system the terrestrial station generates the frequency synchronization signal by using the method of emission and sends it to the satellite via the link 504. This signal is thereafter repeated by the satellite and transmitted to the satellite terminal via the link 505. The satellite terminal is then able to carry out the method of reception.

In another embodiment the satellite is adapted for generating the synchronization signal by using the method of emission and sends it to the satellite terminal via the link 505. The satellite terminal is then able to carry out the method of reception.

The invention claimed is:

1. A method for receiving a synchronization signal transmitted by a radio transmitter using at least two different first frequencies, each of the at least two first frequencies being within a corresponding one of at least two first temporal intervals separated by a different respective first duration, said first temporal intervals being of identical length, said first durations have a different length for each of said at least two different first frequencies, the method comprising:

a first step of, using a radio receiver, receiving and demodulating the synchronization signal, said demodulation being carried out using a locally generated second frequency;

a second step of, using the radio receiver, determining: (1) at least two second temporal intervals in which an energy of the demodulated synchronization signal is at a maximum, and (2) at least one second duration separating the at least two second temporal intervals;

the second step further including comparing the at least one second duration and said first durations in order to determine at least one gap between at least one of the first frequencies and said second frequency; and a third step of synchronizing the radio receiver to the synchronization signal using said at least one gap.

2. The method according to claim 1, wherein:
the radio transmitter is a terrestrial station or a satellite, and
the radio receiver is a satellite terminal.

3. The method according to claim 1, wherein the at least two second temporal intervals are three second temporal intervals, and wherein the at least one second duration is two second durations separating the three second temporal.

4. A synchronization method of a communication system, the method comprising:

determining, by at least one radio transmitter, at least two different first frequencies, each of the at least two first frequencies being within a corresponding one of at least two first temporal intervals separated by a different respective first duration, said first temporal intervals being of identical length, said first durations have a different length for each of said at least two different first frequencies;

transmitting, by the at least one radio transmitter, a synchronization signal comprising the at least two different first frequencies in the corresponding at least two first temporal intervals and said first durations;

receiving and demodulating, by at least one satellite terminal, the synchronization signal, said demodulation being carried out using a locally generated second frequency;

determining, by the at least one satellite terminal, at least two second temporal intervals in which an energy of the demodulated synchronization signal is at a maximum, and determining at least one second duration separating the at least two second temporal intervals;

comparing, by the at least one satellite terminal, the at least one second duration and said first durations in order to determine at least one gap between at least one of the first frequencies and said second frequency; and synchronizing the at least one satellite terminal to the synchronization signal using said at least one gap, wherein the at least one radio transmitter includes at least one of the following: a terrestrial station, and a satellite.

* * * * *

UNITED STATES PATENT AND TRADEMARK OFFICE
CERTIFICATE OF CORRECTION

PATENT NO. : 9,325,370 B2
APPLICATION NO. : 13/956239
DATED : April 26, 2016
INVENTOR(S) : Marc Touret et al.

Page 1 of 1

It is certified that error appears in the above-identified patent and that said Letters Patent is hereby corrected as shown below:

ON THE TITLE PAGE

In the Assignee Information:

In the assignee's residence please replace "Courbevoie, Paris" with --Courbevoie (FR)--.

Signed and Sealed this
Twenty-first Day of June, 2016

Michelle K. Lee
*Director of the United States Patent and Trademark Office*